US010484419B1

(12) United States Patent
Davis et al.

(10) Patent No.: US 10,484,419 B1
(45) Date of Patent: Nov. 19, 2019

(54) CLASSIFYING SOFTWARE MODULES BASED ON FINGERPRINTING CODE FRAGMENTS

(71) Applicant: EMC IP Holding Company LLC, Hopkinton, MA (US)

(72) Inventors: Sashka Davis, Vienna, VA (US); Kevin Douglas, Vienna, VA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 15/664,902

(22) Filed: Jul. 31, 2017

(51) Int. Cl.
*H04L 29/06* (2006.01)
*G06F 17/30* (2006.01)
*G06F 21/53* (2013.01)
*G06F 9/455* (2018.01)

(52) U.S. Cl.
CPC .......... *H04L 63/1441* (2013.01); *G06F 21/53* (2013.01); *H04L 63/145* (2013.01); *G06F 9/45558* (2013.01); *G06F 2221/033* (2013.01); *H04L 2463/121* (2013.01)

(58) Field of Classification Search
CPC .... H04L 63/1441; H04L 63/145; G06F 21/53
See application file for complete search history.

(56) References Cited

U.S. PATENT DOCUMENTS 9,183,387 B1 * 11/2015 Altman ................. G06F 21/554
9,720,925 B1 * 8/2017 Lawson .................... G06F 8/54
2015/0172303 A1 * 6/2015 Humble ............... H04L 63/1408 726/23
2016/0127398 A1 * 5/2016 Cohen ............... G06F 16/24578 726/23
2016/0261612 A1 * 9/2016 Mesdaq ................. H04L 63/145
2018/0083995 A1 * 3/2018 Sheth ..................... H04L 43/00

OTHER PUBLICATIONS

Jesse Kornblum, "Identifying Almost Identical Files Using Context Triggered Piecewise Hashing," Digital Investigation: The International Journal of Digital Forensics & Incident Response, Sep. 2006, pp. 91-97, vol. 3, No. S1.

(Continued)

*Primary Examiner* — Noura Zoubair
(74) *Attorney, Agent, or Firm* — Ryan, Mason & Lewis, LLP

(57) ABSTRACT

A method includes extracting one or more code fragments from a first software module and computing fingerprints of the code fragments extracted from the first software module. The method also includes determining a similarity score based on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments. The method further includes classifying the first software module as the given software module type based on the similarity score and modifying access by a given client device to the first software module responsive to classifying the first software module as the given software module type.

20 Claims, 5 Drawing Sheets

(56) References Cited

OTHER PUBLICATIONS

V. Grayoso Martinez et al., "A New Edit Distance for Fuzzy Hashing Applications," The International Conference on Security and Management (SAM), 2015, pp. 326-332.
Microsoft Corporation, "Microsoft Portable Executable and Common Object File Format Specification—Revision 6.0," Feb. 1999, 77 pages.
Matt Pietrek, "Peering Inside the PE: A Tour of the Win32 Portable Executable File Format," https://msdn.microsoft.com/en-su/library/ms809762(d=printer).aspx, Mar. 1994, 30 pages.

* cited by examiner

CLASSIFYING SOFTWARE MODULES BASED ON FINGERPRINTING CODE FRAGMENTS

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware. Malware can pose a threat to an individual user and that user's devices, as well as possibly threatening an entity associated with the user. Users or members of an entity can become victims of malware-based attacks through a variety of different infection vectors including but not limited to visiting suspicious web sites, connecting machines or devices to untrusted networks, using infected universal serial bus (USB) drives, opening suspicious e-mail attachments, etc.

SUMMARY

Illustrative embodiments of the present invention provide techniques for the classification of software modules, including potentially malicious software modules such as malware.

In one embodiment, a method comprises extracting one or more code fragments from a first software module and computing fingerprints of the code fragments extracted from the first software module. The method also comprises determining a similarity score based on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments. The method further comprises classifying the first software module as the given software module type based on the similarity score and modifying access by a given client device to the first software module responsive to classifying the first software module as the given software module type. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
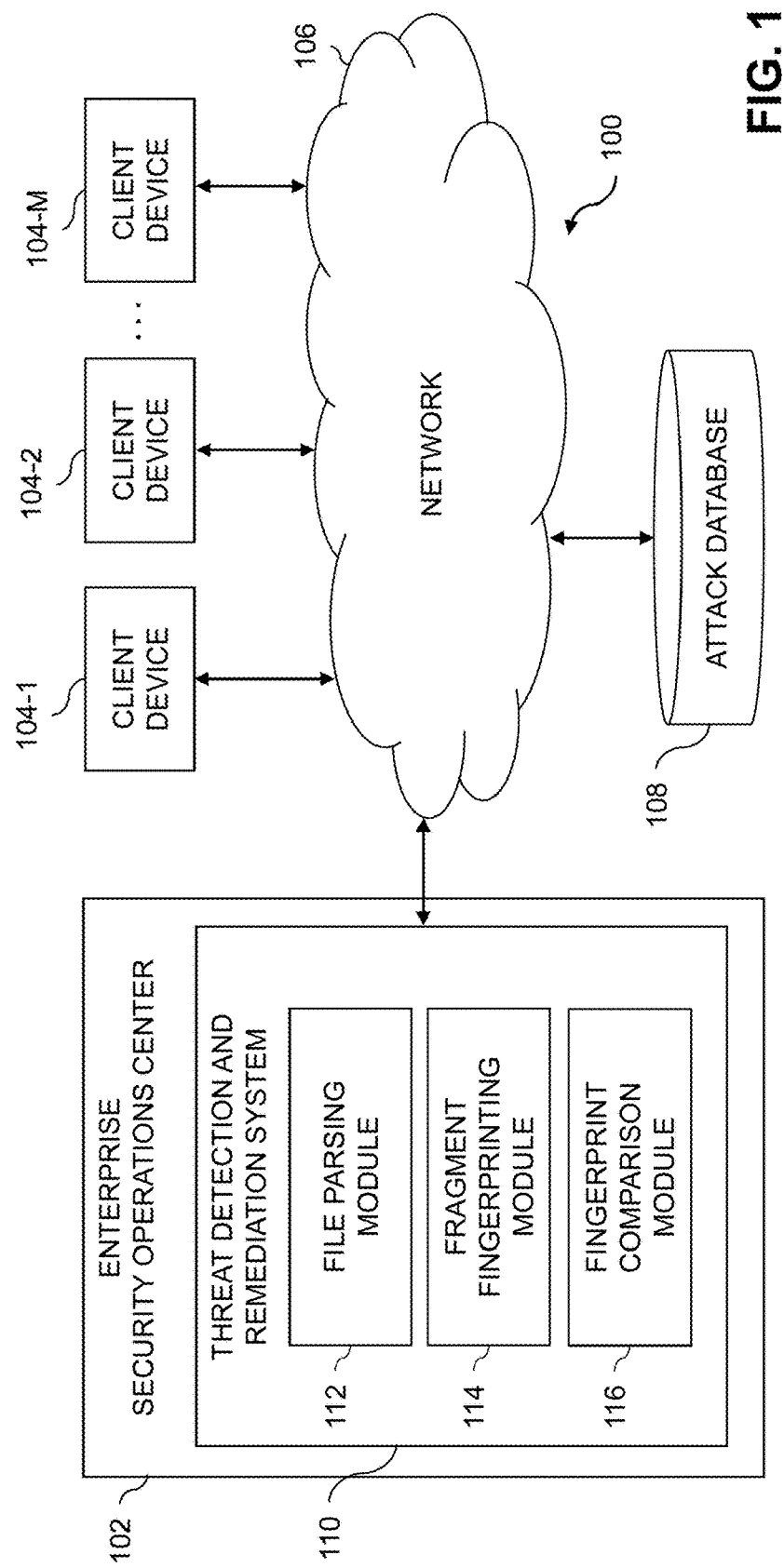
FIG. 1 is a block diagram of an information processing system for classifying software modules in an illustrative embodiment of the invention.

FIG. 1 shows an information processing system 100 configured in accordance with an illustrative embodiment. The information processing system 100 is assumed to be built on at least one processing platform and provides functionality for classifying software modules utilizing fingerprinting of code fragments. In this embodiment, the system 100 more particularly comprises an enterprise security operations center (SOC) 102 and a plurality of client devices 104-1, 104-2, ... 104-M, collectively referred to herein as client devices 104. The client devices 104 are coupled to a network 106. Also coupled to the network 106 is an attack database 108, which may store information relating to previously classified software modules.

Software modules, such as executables (EXEs) and dynamic link library (DLL) modules or DLLs, may be malicious. Malicious software modules include but are not limited to malware and adware. While various embodiments are described below in the context of classifying EXEs, embodiments are not limited solely to classifying these types of software modules. The techniques described below in the context of EXE software modules may be adapted for use with other types of software modules such as DLLs or more generally other types of files that are potentially malicious.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The attack database 108, as discussed above, is configured to store and record information relating to threats and attacks including information related to previously classified software modules. The attack database 108 may, in some embodiments, more particularly store a blacklist of known malicious or potentially malicious software modules such as malware, as well as other information characterizing known malicious or potentially malicious software modules including previous patterns of attack used by known malicious or potentially malicious software modules. The attack database 108 in some embodiments also stores a graylist of known or suspected adware, as well as other information characterizing known or suspected adware including previous patterns of attack used by known or suspected adware. In other embodiments, various additional or alternative information may be stored in attack database 108, such as a whitelist of known benign previously classified software modules or information associated with known benign software modules.

The attack database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more potentially malicious software modules, removing potentially malicious software modules from one or more of the client devices 104, requiring potentially malicious software modules to be run in a sandboxed or other protected environment on one or more of the client devices 104, requiring user input or authentication to obtain or run the potentially malicious software modules, triggering further review of software modules classified as potentially malicious, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to classify software modules such as EXEs based on fingerprinting of code fragments.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a file parsing module 112, a fragment fingerprinting module 114 and a fingerprint comparison module 116.

The file parsing module 112 is configured to extract one or more code fragments from a first software module. The fragment fingerprinting module 114 is configured to compute fingerprints of the code fragments extracted from the first software module. The fingerprint comparison module 116 is configured to determine a similarity score based on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments. The fingerprint comparison module 116 is further configured to classify the first software module as the given software module type based on the similarity score, and to modify access by a given client device to the first software module responsive to classifying the first software module as the given software module type.

Figure 2:
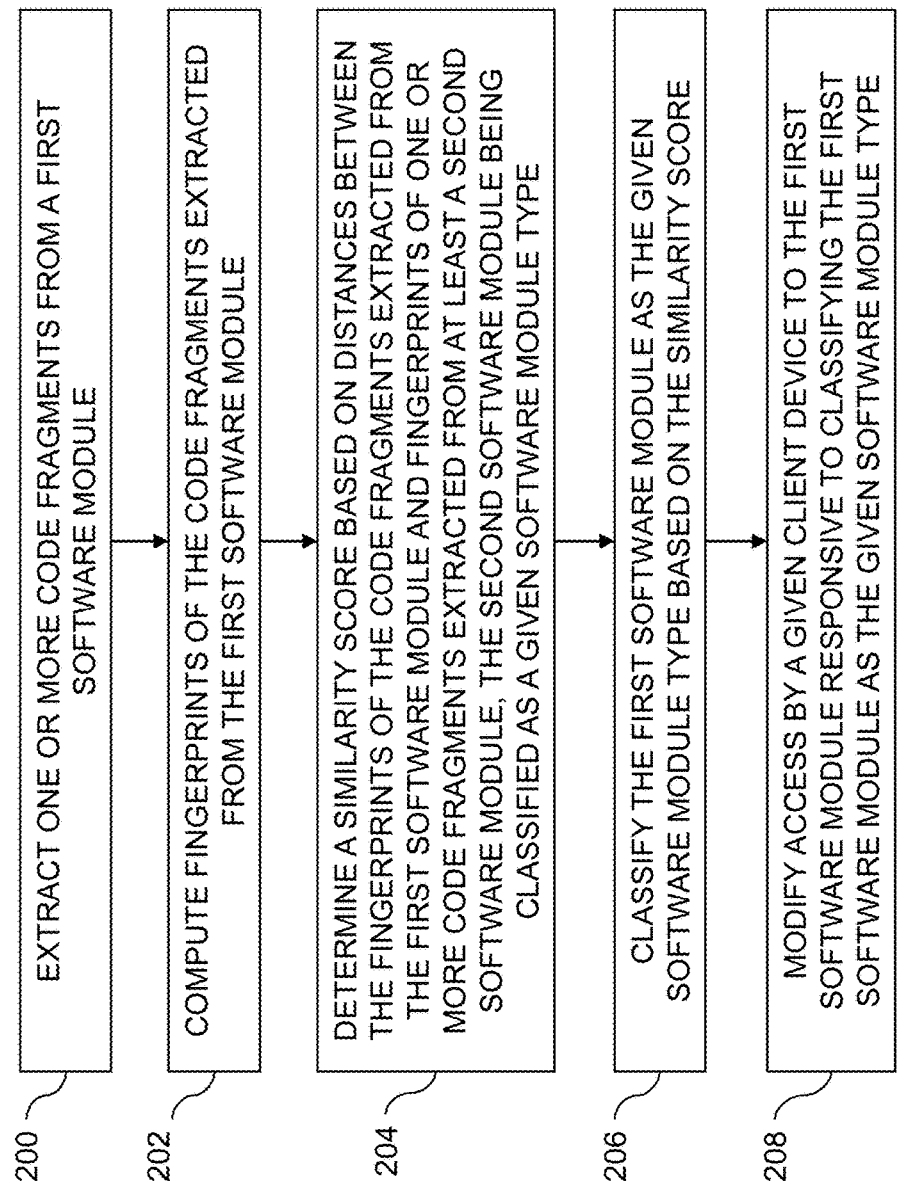
FIG. 2 is a flow diagram of an exemplary process for classification of software modules in an illustrative embodiment.
Figure 3:
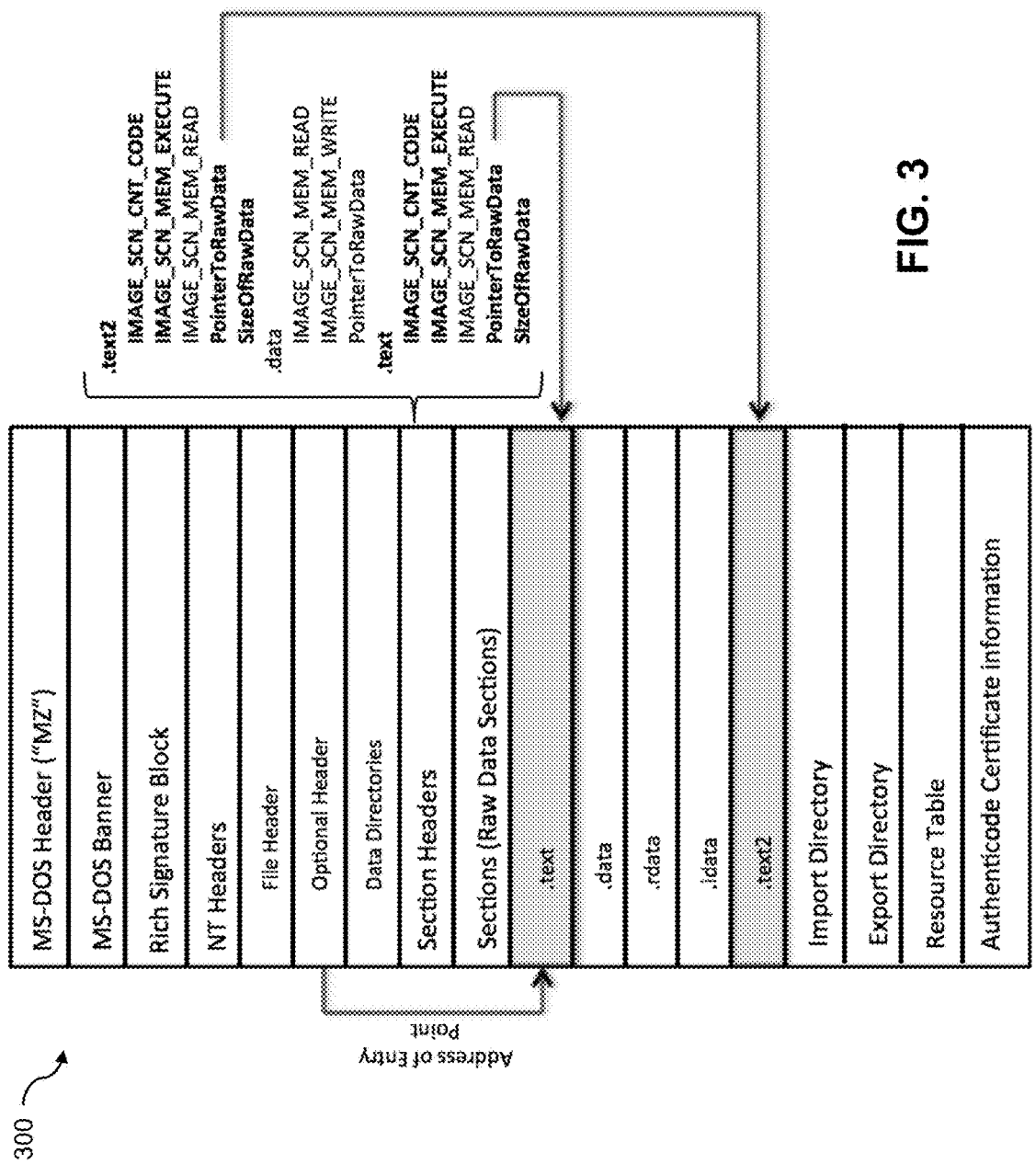
FIG. 3 shows an example of sections and headers in an executable file in an illustrative embodiment.

Additional details regarding the file parsing module 112, fragment fingerprinting module 114 and fingerprint comparison module 116 will be described in further detail below with respect to FIGS. 2 and 3.

It is to be appreciated that the particular arrangement of the enterprise SOC 102, threat detection and remediation system 110, file parsing module 112, fragment fingerprinting module 114 and fingerprint comparison module 116 illustrated in the FIG. 1 embodiment is presented by way of example only, and alternative arrangements can be used in other embodiments. As discussed above, for example, the enterprise SOC 102, threat detection and remediation system 110, file parsing module 112, fragment fingerprinting module 114 and fingerprint comparison module 116 may in some embodiments be implemented internal to one or more of the client devices 104. As another example, the functionality associated with the file parsing module 112, fragment fingerprinting module 114 and fingerprint comparison module 116 may be combined into one module, or separated across more than two modules with the multiple modules possibly being implemented with multiple distinct processors or processing devices.

At least portions of the file parsing module 112, fragment fingerprinting module 114 and fingerprint comparison module 116 may be implemented at least in part in the form of software that is stored in memory and executed by a processor.

It is to be understood that the particular set of elements shown in FIG. 1 for classification of software modules is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (SIEM) system, etc.

The threat detection and remediation system 110 and other portions of the system 100, as will be described in further detail below, may be implemented at least in part using one or more processing platforms including public or private cloud infrastructure, or other distributed virtual infrastructure.

An exemplary process for classification of software modules utilizing fingerprinting of code fragments will now be described in more detail with reference to the flow diagram of FIG. 2. It is to be understood that this particular process is only an example, and that additional or alternative processes for classification of software modules utilizing fingerprinting of code fragments can be carried out in other embodiments.

In this embodiment, the process includes steps 200 through 208. These steps are assumed to be performed by the threat detection and remediation system 110 utilizing the file parsing module 112, fragment fingerprinting module 114 and fingerprint comparison module 116. The process begins with step 200, extracting one or more code fragments from a first software module. The first software module may be a binary executable file.

At least one of the code fragments extracted from the first software module in step 200 may comprise executable code. Extracting the code fragments in step 200 may comprise parsing section headers of the first software module to identify one or more raw data sections comprising executable code. One or more specified field characteristics may be utilized to identify the one or more raw data sections comprising executable code. The one or more specified field characteristics may comprise at least one of one or more specified section flags and one or more fields specifying offsets to a starting address for code execution.

The process continues with step 202, computing fingerprints of the code fragments extracted from the first software module. In step 204, a similarity score is determined based on distances between the fingerprints of the code fragments extracted from the first software module and fingerprints of one or more code fragments extracted from at least a second software module. The second software module is classified as a given software module type, such as malware or adware. Each of the fingerprints, for code fragments extracted from both the first software module and the second software module, may be computed by application of a fuzzy hash function to individual ones of the code fragments.

Step 206 includes classifying the first software module as the given software module type based on the similarity score. Access by a given client device, such as one of client devices 104, is modified in step 208 responsive to classifying the first software module as the given software module type. Modifying access by the given client device to the first software module may include at least one of removing the first software module from a memory or storage of the given client device, preventing the given client device from obtaining the first software module, and causing the first software module to be opened in a sandboxed application environment on the given client device.

In some embodiments steps 202 and 204 include creating a set of hash tables comprising at least a first hash table, the first hash table being keyed by fingerprints of a set of software modules classified as the given software module type, the set of software modules comprising at least the second software module. The similarity score may comprise a number of similar fingerprints, each similar fingerprint comprising a code fragment extracted from the first software module having a distance to one or more of the fingerprints in the first hash table less than a threshold distance. Classifying the first software module as the given software module type in step 206 may be responsive to the similarity score exceeding a threshold number of similar fingerprints.

The set of hash tables may comprise two or more hash tables, each of the two or more hash tables being keyed by fingerprints of a corresponding set of software modules with one or more common functional attributes. Determining the similarity score in step 204 may include determining a table similarity score for each of the two or more hash tables, the table similarity score for a given hash table comprising a number of similar fingerprints, each similar fingerprint comprising a code fragment extracted from the first software module whose distance to one or more of the fingerprints in the given hash table is less than a threshold distance. Classifying the first software module in step 206 may further include classifying the first software module as having the common functional attributes of the given hash table responsive to the table similarity score for the given hash table exceeding a threshold number of similar fingerprints.

In some embodiments, the similarity score determined in step 204 comprises a highest fragment similarity score for extracted code fragments of the first software module that match a fingerprint of an extracted code fragment of the second software module.

The first software module may comprise a plurality of sections, and the similarity score determined in step 204 in some embodiments is based on a fraction of the plurality of sections of the first software module having an extracted code fragment with a fingerprint that matches a fingerprint of an extracted code fragment of the second software module in a corresponding section. In some embodiments, the plurality of sections of the first software module have a given order, and the similarity score determined in step 204 is based on a longest ordered portion of two or more sections of the first software module having two or more extracted code fragments with fingerprints that match two or more fingerprints of extracted code fragments of the second software module in a corresponding ordered portion of two or more sections.

In some embodiments, the similarity score determined in step 204 is based on a weighted sum of fragment similarity scores for extracted code fragments of the first software module with fingerprints that match a fingerprint of an extracted code fragment of the second software module, wherein the weights assigned to each of the fragment scores are based on the lengths of the extracted code fragments.

The similarity score determined in step 204 may be further based on comparing import application programming interfaces of the first and second software modules.

In some embodiments, the first software module and the second software module are associated with respective timestamps, and classifying the first software module in step 206 further comprises creating a directed edge in an edge-weighted directed acyclic graph between a first node representing the first software module and a second node representing the second software module responsive to classifying the first software module as the given software module type. A direction of the directed edge between the first node and the second node is based on the associated timestamps of the first software module and the second software module, and a weight assigned to the directed edge is based on the similarity score determined in step 204.

Analysis of software modules such as binary files, including EXEs and DLLs, is an important task that many enterprises perform frequently, such as daily, to prevent a variety of cyber-attacks. A cyber-attack may be considered as having a delivery stage and an install stage. The delivery stage of an attack chain often starts with an attachment, such as an e-mail attachment, being presented to an unsuspecting user. The install stage of the attack chain is where a malicious executable or other software module is installed on the victim's system, such as on one of the client devices 104 in system 100. An installed malicious software module may facilitate different types of criminal or other harmful activities, including but not limited to Command-and-Control, keylogging, harvesting of a victim's passwords, exfiltration of enterprise proprietary data, ransomware activities, etc. Computationally efficient comparison and measurement of similarity between software modules such as binary portable executable (PE) files is invaluable for automatic triage and classification of malware, adware or other malicious software.

In some embodiments, software module similarity techniques are utilized wherein executable code is extracted from a software module, followed by fingerprinting of each executable fragment separately. Similarity between two software modules may thus be estimated by comparing the similarities of fingerprints for executable code fragments of the software modules. Such estimated similarity may be used to classify unknown software modules.

Various embodiments are described below with respect to an illustrative implementation for fingerprinting of Microsoft® (MS) Windows PE files. It is to be appreciated, however, that techniques described herein are not limited to use in classifying PE files, but rather are more generally applicable to classifying various types of software modules, DLLs and other binary files containing executable code. All fragments of executable code may be extracted from a PE file, followed by computing a fuzzy hash function on each executable code fragment separately to determine fingerprints of the different executable code fragments. The similarities between the resulting fingerprints are used to estimate the similarity between two PE files.

Fuzzy hashing can be used to compare arguments or inputs that have similar structures, such as sequences of identical bytes in the same order, although bytes between such sequences may be different in content and/or length. Fuzzy hashing can be implemented using different algorithms that fall in one of two categories: context-triggered piecewise hashing and block-based hashing.

One exemplary implementation of a fuzzy hash function is the SSDEEP function that uses an algorithm that belongs to the context-triggered piecewise hashing class. SSDEEP is symmetric, simple and efficient, and it does not take additional parameters to perform its computation. Other fuzzy hash functions provide similar capabilities for computing a short fingerprint for an argument and providing means for computing a distance between fingerprints so as to estimate similarity between the original arguments. Examples of fuzzy hash functions that belong to the class of block-based hashing are sdhash, SimHash, and mvHash-B.

A variety of fuzzy hash functions may be used for estimating the similarity of binary files, and for clustering. Fuzzy hashing utilizes a pair of functions. One function takes a string as argument, and outputs a short fingerprint of the argument. The string may include the entire binary file, or one or more portions thereof such as executable code fragments of a binary file used in some embodiments. The other function is a distance or compare function, which takes as input two fingerprints and outputs a number in some range, such as a number in the range [0,100]. The output of the compare function measures the similarity between the two fingerprints. Using the example range [0,100], the compare function output 0 means that two fingerprints are determined to be dissimilar, while a value of 100 for the compare function output means that the two fingerprints exhibit maximal similarity. It is to be appreciated that although various embodiments described herein use a range of [0,100] as the output for a compare function, this is not a requirement. Various other ranges may be used as desired.

Clustering of binary files using fuzzy hash functions aims to group together files whose fingerprint similarity values exceed a defined threshold, which may be heuristically estimated. One approach is to compute a fingerprint of an entire binary file, and to compare resulting fingerprints for multiple binary files to cluster the binary files or otherwise determine similarity between different binary files. Another approach is to utilize fuzzy hash functions to compute fingerprints of the list of import application programming interfaces (APIs) for binary files and to use similarity between those fingerprints for clustering binary files.

In some embodiments, different approaches for fuzzy hashing are utilized to classify software modules. First, executable code fragments are extracted from binary files. It is not uncommon for a binary file, such as a PE file, to have multiple sections containing executable code. Some malware instances scatter executable code in as many as 11 distinct sections of a PE file. Executable code has relatively high average entropy, as compared to other sections of a PE file such as resource sections, static data, or sections that contain English text. Each fragment of executable code is fingerprinted separately using fuzzy hashing. The high average entropy of the executable code implies that when the fingerprints of two fragments are compared, the corresponding distances will be bi-modal and thus will concentrate towards the minimum and maximum of a range, such as 0 and 100, respectively. Experiments on sample data confirm these expectations, where almost all fuzzy hash similarities of executable code were equal to 0 or 100, while very few were in the range [90,100].

A similarity between any two fingerprints of executable code of 100, or close to 100 as defined by some threshold such as being in the range [90,100], implies that the executable fragments are almost identical and therefore the binary files that contain such executable fragments share code and are compiled with similar compilation options. Thus, when similarity close to 100 is detected, it is concluded that binary files containing those fragments share code and therefore are similar. Conversely, when the similarity measure between two fingerprints computed on fragments of executable code are 0, or close to 0 as defined by some threshold such as being in the range [0,10], this implies that fuzzy hashing is unable to detect any similarity between the fragments and between the corresponding binary files containing such fragments. It is important to note that the various thresholds mentioned above are presented by way of example only, and that other thresholds may be used in other embodiments. Further, while some embodiments discussed above determine that two binary files are similar if they contain one set of matching fingerprints of executable code fragments, embodiments are not so limited. In other embodiments, two binary files are determined to be similar if they contain two or more sets of matching fingerprints of executable code fragments.

For many binary files, the executable code may be considered the most essential part of that file because it determines all possible behaviors. Different inputs fed to a binary file such as a PE file will result in different execution paths, but the totality of all possible execution paths are encoded in executable code fragments of the binary. Extracting the fragments of executable code and individually fingerprinting each fragment with a fuzzy hash function allows for succinctly describing and capturing the most "essential" components of each binary and also to compare against other fingerprints of the "essential" components of other binaries. In other embodiments, however, it may be desired to fingerprint portions of the code of a software module that do not contain executable code, or portions of the code of a software module that include some executable code and some non-executable code.

While some embodiments described herein utilize the SSDEEP fuzzy hash function, embodiments are not so limited. Various other types of fuzzy hash functions may be utilized. Any specific implementation of a hash function that provides capabilities for computing and comparing fingerprints of binary strings may be used.

Fingerprinting fragments of executable code individually provides various advantages relative to other approaches, such as approaches where fuzzy hash functions are computed on entire binary files or approaches where fuzzy hash functions are computed on the list of import APIs. If two binary files are declared similar using a fuzzy hash function computed on the entire files, the approach of comparing fingerprints of fragments of the executable code in the two binary files will also declare the two binary files similar as the executable fragments are subsets of the entire binary files. The converse, however, does not hold true. It is easy to obfuscate binary files by creating multiple auxiliary sections, and by scattering data across multiple such sections. This simple approach for obfuscation will fool the approach of applying fuzzy hashing on entire files, but approaches which compare executable code fragments of binary files will be invariant to the creation of auxiliary sections as well as variations in section ordering and section naming of binary files.

Approaches for applying fuzzy hashing on the list of import APIs can be easily defeated as well. It is possible to dynamically load most of the APIs that a PE file can call during the course of its execution, thus creating a very short import API table. Fingerprinting such short API tables can be inadequate, as it will erroneously declare completely different PE files as similar. The behavior of a PE file, however, remains encoded in the executable code fragments thereof, and thus approaches for fingerprinting executable code fragments of binary files are invariant to obfuscation of imported APIs.

MS Windows PE files, which are examples of binary files or more generally software modules which may be classified using techniques described herein, are highly structured and comprised of multiple sections and headers as described in the Microsoft Portable Executable and Common Object File Format Specification. FIG. 3 shows an example representation 300 of the Microsoft Portable Executable and Common Object File Format Specification.

In order to extract executable code fragments of a MS Windows PE file, the PE file is parsed to expose its section headers. The section headers identify which raw data sections of the PE file contain executable code, as well as the offset to and size of such sections. In addition to including the offset and size of the raw data sections, the section header indicates characteristics of each raw data section in the PE file. These characteristics are comprised of section flags indicating specific attributes of the sections. As an example, if a section contains executable code, section flags such as IMG_SCN_CNT_CODE and IMG_SCT_MEM_EXECUTE may be set.

Iterating over each section header and checking for these flags allows for identification of each of the raw data sections containing executable code. Once identified, fields such as PointerToRawData and SizeOfRawData can be used to extract the actual executable code fragments from the PE file.

Malware authors may use various obfuscation techniques to obfuscate the sections of a binary file which contain executable code. Some instances of PE file malware, for example, may contain code sections where the IMG_SCT_CNT_CODE section flag is turned off. To compensate for this obfuscation technique, some embodiments may utilize other methods to parse PE files to determine executable code fragments contained therein. The optional header, as illustrated in FIG. 3, contains a field indicating the AddressOfEntryPoint. The address of entry point is an offset to the starting address where code execution begins. The raw data section containing this address may be considered to be a section containing executable code regardless of whether the IMG_SCT_CNT_CODE section flag is on or off. This detection technique therefore permits extraction of executable code fragments even when the above-described obfuscation technique is used by malware authors.

While described above in the context of parsing MS Windows PE files to identify executable code fragments, embodiments are not limited solely to parsing MS Windows PE files. Various other types of binary files or more generally software modules may be parsed to identify executable code contained therein, possibly using other types of flags, section headers, pointers, etc. specific to different types of software modules.

In some embodiments, fuzzy hashing of fragments of executable code can be implemented and deployed for large-scale automatic analysis of software modules. Fuzzy hashing may be used to classify unknown software modules as potentially malicious based on similarity to known malware or adware. More generally, unknown software modules may be classified as any designated type by comparison to known software modules or exemplary executable code fragments contained in known software modules of the designated type.

In the discussion below, $F(\bullet)$ denotes the function used to compute a fingerprint of a fragment of executable code and $D(\bullet,\bullet)$ denotes the function that compares two fingerprints computed with $F(\bullet)$. In some embodiments, $F(\bullet)$ and $D(\bullet,\bullet)$ are SSDEEP functions. More generally, $F(\bullet)$ and $D(\bullet,\bullet)$ represent fuzzy hash functions that provide means for computing a fingerprint and computing the distance between fingerprints, respectively.

Given a collection of known software modules $C=\{f_1, \ldots, f_n\}$, a knowledge base '$\mathcal{H}$' is built. For each software module $f_i \in C$, a set of executable code fragments $f_i^1, \ldots, f_i^m$ is extracted. Fingerprints of $f_i^1, \ldots, f_i^m$ are computed as $F(f_i^1), \ldots, F(f_i^m)$. A hash table '$\mathcal{H}$' is created keyed by the fingerprints $F(f_i^j)$ that maps a fingerprint $f_i^j$ to a single file or a set of files denoted as M such that:

$$f_k \in M \Rightarrow \{(\text{file } f_k \text{ has a fragment } f_k^p) \text{ and } (D(F(f_k^p), F(f_i^j))=100)\}. \quad (1)$$

Equation (1) assumes that the range of the function $D(\bullet,\bullet)$ has a possible range of output values [0,100] as described above, and that an output of 100 indicates similarity. Similarity, however, may alternatively be defined as the output of $D(\bullet,\bullet)$ being in some range such as [90,100]. It is also important to note that various other ranges of outputs for $D(\bullet,\bullet)$ may be used. Thus, the value 100 in Equation (1) may vary as desired based on the output range of $D(\bullet,\bullet)$ and thresholds used to define similarity.

When a new or unknown software module denoted g is to be evaluated for similarity against a given knowledge base described by hash table $\mathcal{H}$ processing may proceed as follows. All executable fragments of g are extracted, and are denoted $g_1, \ldots, g_p$. Fingerprints for each of these fragments are computed and denoted $F(g_1), \ldots, F(g_p)$. The distance $D(F(g_1), F(f_i^j))$ of each fragment of g to each fragment in $\mathcal{H}$ is also computed. If $D(F(g_1), F(f_i^j))>0$, then g is determined to share code and be similar to file $f_i$ as both g and $f_i$ have executable code fragments in common. If the knowledge base $\mathcal{H}$ contains functional or other label attributes for $f_i$, those attributes are likely to be attributes of g as well. As one example, if $f_i$ is labeled as malware, then g may also be classified as malware. It is to be appreciated that the threshold for similarity between g and $f_i$ may vary as desired. For example, while described above as being similar if the g and $f_i$ share one executable code fragment, other embodiments may require that g and $f_i$ share two or more executable code fragments, or some proportion of the total number of executable code fragments in g before g and $f_i$ are determined to be similar.

In some embodiments, the knowledge base $\mathcal{H}$ is implemented as a set of hash tables, where each table contains software modules or fragments thereof with a common functional attribute. In the case of malware, for example, the knowledge base $\mathcal{H}$ may be implemented as a set of hash tables where each individual table contains malware instances with one or more common functional attributes, such as individual tables for ransomware, Trojans of a particular kind, key loggers, etc., rather than one single hash table that contains all types of malware. Distributing the knowledge base to different hash tables also allows for parallelization of the computation of $D(F(g_1),F(f_i^j))$.

In some embodiments, approaches for classifying software modules based on fingerprinting executable code fragments utilize what is referred to herein as maximal similarity. In maximal similarity, two software modules that contain even one similar code segment or fragment are assumed to share code and the similarity score that that similar code segment has can be used as the similarity score. This is essentially the maximum similarity score across all code fragment comparisons.

In other embodiments, approaches for classifying software modules based on fingerprinting executable code fragments utilize what is referred to herein as section-fraction similarity. Software modules may be similar in more than one section. This may be reported as a fraction of sections whose similarity scores are over a designated threshold, over the number of sections or number of unique sections. This may also be done in a weighted manner, as the similarity score between two sections may be used as a weight and the similarity between two software modules may be computed as a weighted sum of the maximal similarity scores for sections within each file.

To compute a similarity score between two software modules, the fragments of executable code from the two software modules are extracted and a fuzzy hash is computed for each fragment. The pairwise distance between the fingerprints of each fragment of executable code of each software module may then be computed. The similarity score between the two software modules can then be computed as the ratio of the number of pairs of fragments whose fuzzy hash similarity is greater than 0, divided by the minimum number of fragments. If the number of fragments of each of the two software modules is the same, such as k, then the minimum number or denominator is set to k. If the two software modules have different numbers of fragments, the minimum number or denominator is set to the number of fragments in the software module having the fewest number of fragments. To project back to the range [0,100] used in some embodiments for the similarity score, the computed ratio is multiplied by 100.

In some embodiments, approaches for classifying software modules based on fingerprinting executable code fragments utilize what is referred to herein as order-based similarity. For order-based similarity, embodiments compare code section similarity and measure the length of the longest ordered similar comparison. There may be other sections inserted between similar segments or fragments, but if section 4 in a first software module is similar to section 1 in a second software module, that may be less important than if sections 2, 3 and 5 from the first software module are similar to sections 2, 4 and 6, respectively, of the second software module. The second is a longer path, even though there are some mismatched segments in the total order.

In other embodiments, approaches for classifying software modules based on fingerprinting executable code fragments utilize what is referred to herein as length-based similarity. For length-based similarity, the similarity between two code segments or fragments is weighted based on the length of those code segments. Similarity is less likely to occur naturally the longer the code segment is, so longer code segments that are similar make it more likely that the source software modules containing such segments are similar. The length-based similarity may be computed as a fraction of the total code length.

Given two software modules $f_1$ and $f_2$, to compute a length-based similarity score fragments of executable code are extracted from $f_1$ and $f_2$ and fuzzy hashes of such fragments are computed. The distances between all pairs of the fuzzy hashes are then compared. If a pair of hashes has similarity 0, then it does not contribute to the overall similarity score for $f_1$ and $f_2$. If the similarity score of two fragments m and n that belong to files $f_1$ and $f_2$, respectively, is greater than 0, then $$\frac{1}{\min\{r_1, r_2\}}$$

is added to the overall similarity score for $f_1$ and $f_2$. $r_1$ is the ratio of the length of m to the total combined length of all executable fragments in $f_1$, and $r_2$ is the ratio of the length of n to the total combined length of all executable fragments in $f_2$. Adding those fractions, in some instances, can add up to a number greater than 1, and in such instances may be rounded down to 1. To obtain a score in the range of [0,100], the overall similarity score computed as the sum of such fractions (rounded down to 1) may be multiplied by 100.

Although described separately above, some embodiments may utilize a combination of two or more of the maximal similarity, section-fraction similarity, order-based similarity and length-based similarity approaches.

In some embodiments, the above-described techniques for classifying software modules based on fingerprinting executable code fragments may be combined with one or more other similarity mechanisms, such as fingerprinting import API similarity described above. If code segments or fragments are similar and import APIs are also similar, this may lead to higher confidence that two software modules are similar. Each similarity measurement, such as fingerprinting executable code fragments and fingerprinting import API similarity, can contribute to an overall view of the similarity between software modules. When there is agreement between such similarity measurements, confidence may be increased. Different similarity measurements may be weighted based on resilience or level of effort to fool from an attacker's perspective.

Similarity scores or other similarity measurements obtained using the techniques described herein may be used to construct what are referred to herein as Malware Genealogy Maps (MGMs). Each malware sample may be associated with a timestamp representing the date and time at which that malware sample was first observed. If an exact timestamp for a particular malware sample is unknown, an approximation may be used. If a malware sample is active over a long period of time, many instances of the malware sample with associated timestamps may be available. In some embodiments, the earliest timestamp for an instance of that malware sample may be kept or stored, such as in attack database 108. The timestamps can be used to induce a partial order on all known malware samples. An edge-weighted directed acyclic graph (DAG) may be constructed for related malware samples, called an MGM herein. The nodes of the MGM are the malware samples. A directed edge from a first malware file A to a second malware file B is present in the MGM if the similarity score between A and B is non-zero and A's timestamp is earlier than B's timestamp. The weight of the edge is equal to the similarity score, which may be a number in the range [0,100] as described above. The DAG of the MGM may be used for a variety of purposes, such as displaying the temporal and executable-code similarity relationships between all malware samples that belong to a given MGM. For a given malware sample A that belongs to an MGM, the MGM can be used to enumerate all malware samples derived from A efficiently, by performing a breadth-first search (BFS) or a depth-first search (DFS) with an origin A in the MGM. Note that this is possible because the MGM is a DAG. All nodes visited during the BFS or DFS traversal are called successors of A. The successor of A can be sorted chronologically by their associated timestamps to present the evolution path of the successors of A.

Embodiments that utilize software module or file similarity techniques based on comparing fuzzy hashes of extracted fragments of executable code provide for efficient and automatic detection of similar files. Such embodiments focus on detecting similarity between fragments of executable code, and as such imply code sharing. As described above, embodiments are well suited for parallelization. Some embodiments are motivated by an assumption that malicious actors would likely distribute many polymorphic copies of each malware instance. If a malicious actor invests little time in obfuscating and creating a polymorphic copy, analyzing and catching such polymorphic copes should also require little time investment. More heavily obfuscated polymorphic instances, even if derived from a common code base, may require greater time investment, in terms of computational or storage resources, to analyze and catch or classify polymorphic instances of known malware.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
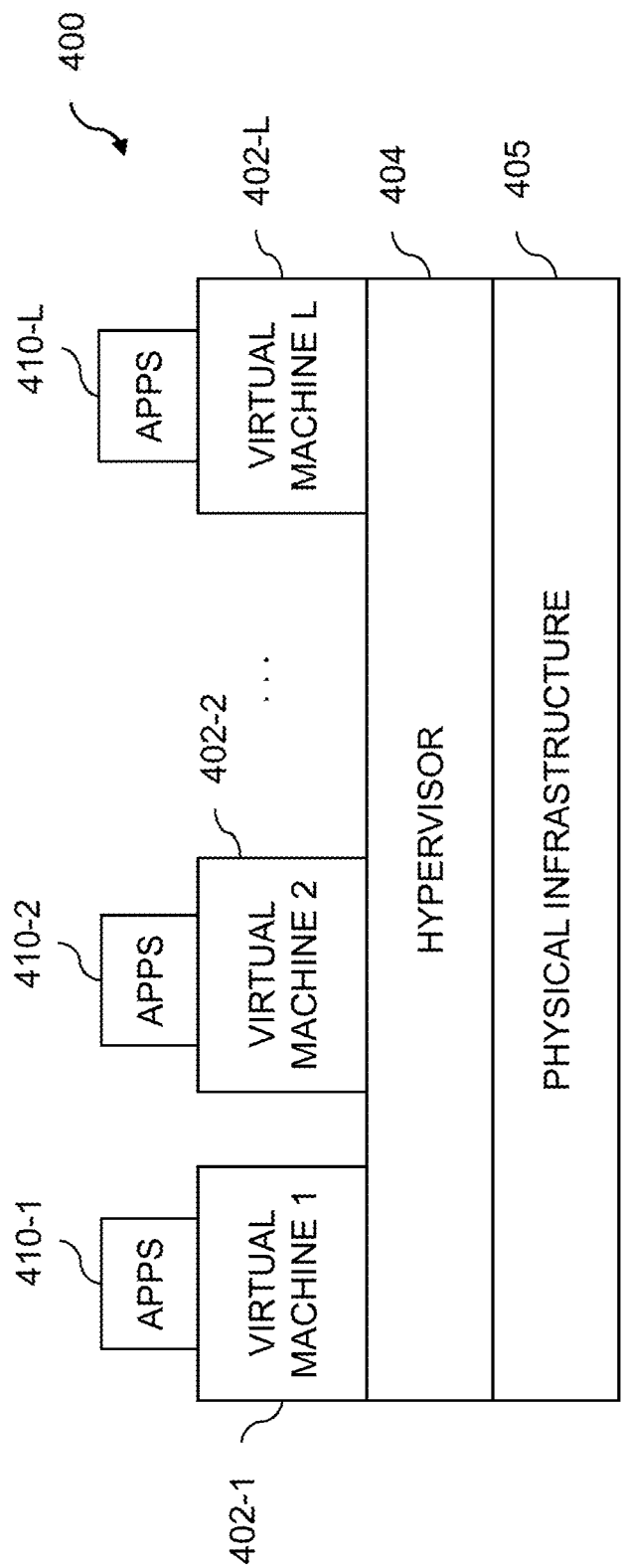
FIGS. 4 and 5 show examples of processing platforms that may be utilized to implement at least a portion of the FIG. 1 system.
Figure 5:
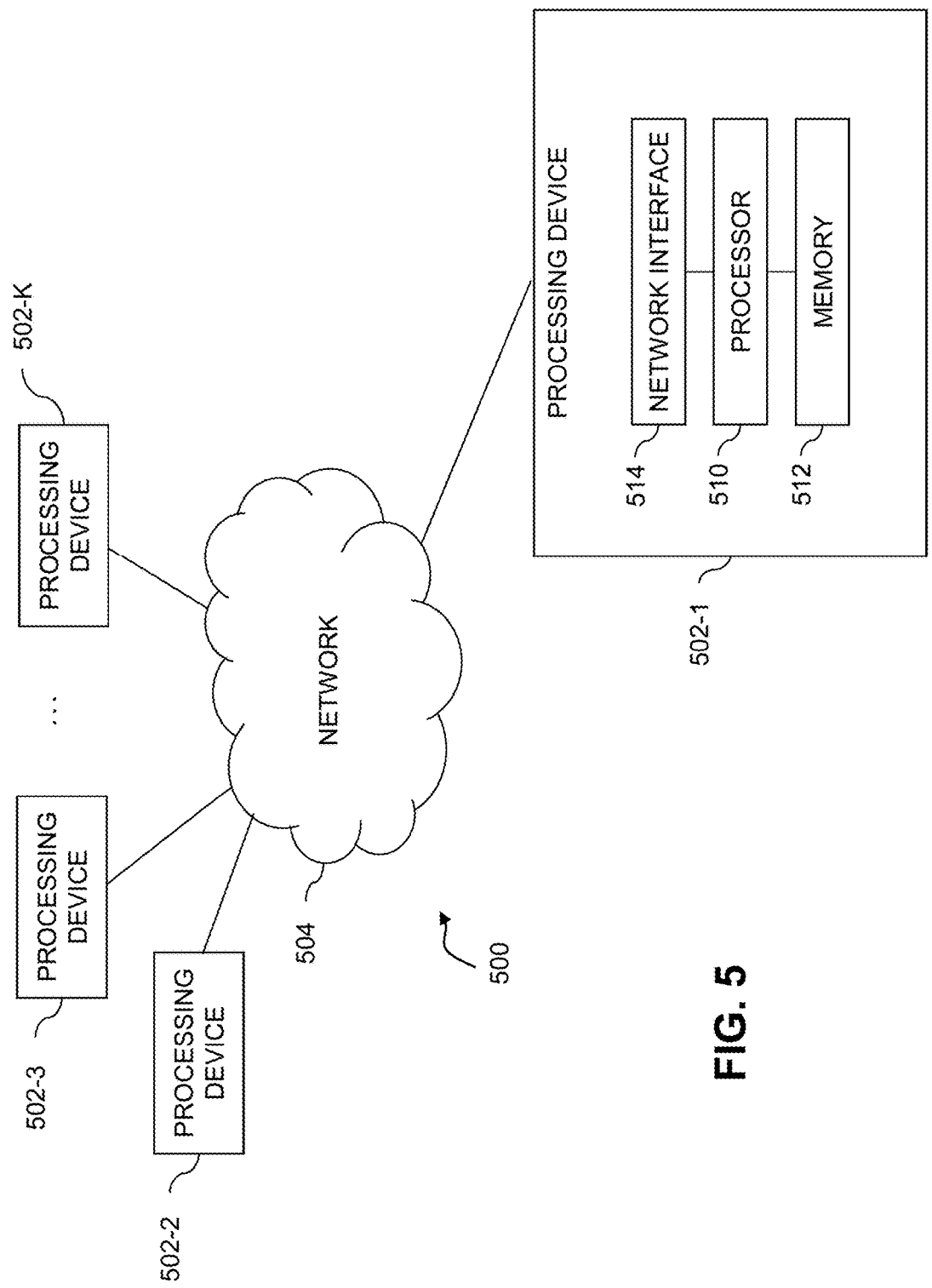

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VIVIAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for classifying software modules as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for classifying software modules utilizing fingerprinting of code fragments are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the classification functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
    extracting one or more code fragments from a first software module, wherein extracting the one or more code fragments comprises parsing section headers for a plurality of sections of the first software module to identify raw data sections comprising executable code of the first software module;
    computing fingerprints of the code fragments extracted from the first software module; determining a similarity score based at least in part on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments;
    classifying the first software module as the given software module type based at least in part on the similarity score; and
    modifying access by a given client device to the first software module responsive to classifying the first software module as the given software module type;
    wherein the plurality of sections of the first software module are arranged in a designated order, and wherein the similarity score is based at least in part on a number of ordered raw data sections comprising executable code in a first ordered portion of two or more of the raw data sections comprising executable code of the first software module with fingerprints that match second ordered portion of two or more raw data sections comprising executable code of the second software module; and
    wherein the method is performed by at least one processing device comprising a processor coupled to a memory.

2. The method of claim 1 wherein the given software module type comprises one of malware and adware.

3. The method of claim 1 wherein the first software module comprises a binary executable file.

4. The method of claim 1 wherein at least one of the code fragments extracted from the first software module comprises executable code.

5. The method of claim 1 wherein parsing the section headers comprises utilizing one or more specified field characteristics to identify the raw data sections comprising executable code, the one or more specified field characteristics comprise at least one of:
    one or more specified section flags; and
    one or more fields specifying offsets to a starting address for code execution.

6. The method of claim 1 further comprising creating a set of hash tables comprising at least a first hash table, the first hash table being keyed by fingerprints of a set of software modules classified as the given software module type, the set of software modules comprising at least the second software module.

7. The method of claim 6 wherein:
the similarity score comprises a number of similar fingerprints, each similar fingerprint comprising a code fragment extracted from the first software module having a distance to one or more of the fingerprints in the first hash table less than a threshold distance; and
classifying the first software module as the given software module type is responsive to the similarity score exceeding a threshold number of similar fingerprints.

8. The method of claim 6 wherein:
the set of hash tables comprises two or more hash tables, each of the two or more hash tables being keyed by fingerprints of a corresponding set of software modules with one or more common functional attributes;
determining the similarity score comprises determining a table similarity score for each of the two or more hash tables, the table similarity score for a given hash table comprising a number of similar fingerprints, each similar fingerprint comprising a code fragment extracted from the first software module whose distance to one or more of the fingerprints in the given hash table is less than a threshold distance; and
further comprising classifying the first software module as having the common functional attributes of the given hash table responsive to the table similarity score for the given hash table exceeding a threshold number of similar fingerprints.

9. The method of claim 1 wherein the similarity score comprises a highest fragment similarity score for extracted code fragments of the first software module that match a fingerprint of an extracted code fragment of the second software module.

10. The method of claim 1 wherein the similarity score is based at least in part on a fraction of the plurality of sections of the first software module having an extracted code fragment with a fingerprint that matches a fingerprint of an extracted code fragment of the second software module in a corresponding section.

11. The method of claim 1 wherein the similarity score is based at least in part on a weighted sum of fragment similarity scores for extracted code fragments of the first software module with fingerprints that match a fingerprint of an extracted code fragment of the second software module, wherein the weights assigned to each of the fragment scores are based at least in part on the lengths of the extracted code fragments.

12. The method of claim 1 wherein the similarity score is further determined based at least in part on comparing import application programming interfaces of the first software module and the second software module.

13. The method of claim 1 wherein modifying access by the given client device to the first software module comprises at least one of:
removing the first software module from a memory or storage of the given client device;
preventing the given client device from obtaining the first software module; and
causing the first software module to be opened in a sandboxed application environment on the given client device.

14. The method of claim 1 wherein the first software module and the second software module are associated with respective timestamps, and further comprising creating a directed edge in an edge-weighted directed acyclic graph between a first node representing the first software module and a second node representing the second software module responsive to classifying the first software module as the given software module type, a direction of the directed edge between the first node and the second node being based at least in part on the associated timestamps of the first software module and the second software module, and a weight assigned to the directed edge being based at least in part on the similarity score.

15. A computer program product comprising a non-transitory processor-readable storage medium having stored therein program code of one or more software programs, wherein the program code when executed by at least one processing device cause the at least one processing device:
to extract one or more code fragments from a first software module, wherein extracting the one or more code fragments comprises parsing section headers for a plurality of sections of the first software module to identify raw data sections comprising executable code of the first software module;
to compute fingerprints of the code fragments extracted from the first software module;
to determine a similarity score based at least in part on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments;
to classify the first software module as the given software module type based at least in part on the similarity score; and
to modify access by a given client device to the first software module responsive to classifying the first software module as the given software module type;
wherein the plurality of sections of the first software module are arranged in a designated order, and wherein the similarity score is based at least in part on a number of ordered raw data sections comprising executable code in a first ordered portion of two or more of the raw data sections comprising executable code of the first software module with fingerprints that match a second ordered portion of two or more raw data sections comprising executable code of the second software module.

16. The computer program product of claim 15 wherein the program code when executed further causes the at least one processing device to create a set of hash tables comprising at least a first hash table, the first hash table being keyed by fingerprints of a set of software modules classified as the given software module type, the set of software modules comprising at least the second software module, and wherein:
the similarity score comprises a number of similar fingerprints of the code fragments extracted from the first software module whose distance to one or more of the fingerprints in the first hash table is less than a threshold distance; and
classifying the first software module as the given software module type is responsive to the similarity score exceeding a threshold number of similar fingerprints.

17. An apparatus comprising:
at least one processing device comprising a processor coupled to a memory;

the at least one processing device being configured:

to extract one or more code fragments from a first software module, wherein extracting the one or more code fragments comprises parsing section headers for a plurality of sections of the first software module to identify raw data sections comprising executable code of the first software module;

to compute fingerprints of the code fragments extracted from the first software module;

to determine a similarity score based at least in part on distances between the fingerprints of the code fragments extracted from the first software module and fingerprints of one or more code fragments extracted from at least a second software module, the second software module being classified as a given software module type, each of the fingerprints being computed by application of a fuzzy hash function to a given one of the code fragments;

to classify the first software module as the given software module type based at least in part on the similarity score; and to modify access by a given client device to the first software module responsive to classifying the first software module as the given software module type;

wherein the plurality of sections of the first software module are arranged in a designated order, and wherein the similarity score is based at least in part on a number of ordered raw data sections comprising executable code in a first ordered portion of two or more of the raw data sections comprising executable code of the first software module with fingerprints that match a second ordered portion of two or more raw data sections comprising executable code of the second software module.

18. The apparatus of claim 17 wherein the at least one processing device is further configured to create a set of hash tables comprising at least a first hash table, the first hash table being keyed by fingerprints of a set of software modules classified as the given software module type, the set of software modules comprising at least the second software module, and wherein:

the similarity score comprises a number of similar fingerprints of the code fragments extracted from the first software module whose distance to one or more of the fingerprints in the first hash table is less than a threshold distance; and classifying the first software module as the given software module type is responsive to the similarity score exceeding a threshold number of similar fingerprints.

19. The method of claim 1 wherein the first ordered portion and the second ordered portion each comprise one or more sections not comprising executable code between two raw data sections comprising executable code.

20. The method of claim 19 wherein the first ordered portion comprises at least one section not comprising executable code inserted in a first position between two raw data sections comprising executable code and the second ordered portion comprises at least one section not comprising executable code inserted in a second position between two raw data sections comprising executable code, the second position being different than the first position.

* * * * *

UNITED STATES PATENT AND TRADEMARK OFFICE
CERTIFICATE OF CORRECTION

PATENT NO. : 10,484,419 B1
APPLICATION NO. : 15/664902
DATED : November 19, 2019
INVENTOR(S) : Sashka Davis et al.

It is certified that error appears in the above-identified patent and that said Letters Patent is hereby corrected as shown below:

In the Specification

Column 11, Line 18 please delete "'$\mathcal{H}$'" and insert therefor --$\mathcal{H}$--

Column 11, Line 21 please delete "'$\mathcal{H}$'" and insert therefor --$\mathcal{H}$--

Column 11, Line 42 please delete "$F(g_1$" and insert therefor --$F(g_1)$--

Column 16, Line 19 please delete "VIVIAX®" and insert therefor --VMAX®--

In the Claims

Claim 1, Column 18, Line 22 please insert a return after "software module;"

Claim 1, Column 18, Line 43 please insert --a-- between "match" and "second"

Signed and Sealed this
Seventh Day of April, 2020

Andrei Iancu
*Director of the United States Patent and Trademark Office*